UNITED STATES PATENT OFFICE.

TSUTOMU SHIOMI, OF TOKYO FU, JAPAN, ASSIGNOR TO FURUKAWA GOMEI KAISHA, OF TOKYO, JAPAN.

PROCESS OF REDUCING SULFUR DIOXID.

1,359,114.      Specification of Letters Patent.     Patented Nov. 16, 1920.

No Drawing.     Application filed January 15, 1919. Serial No. 271,306.

*To all whom it may concern:*

Be it known that I, TSUTOMU SHIOMI, subject of Japan, resident of No. 400 Nishiokubo, Okubo Machi, Toyotama Gun, Tokyo Fu, Japan, have invented certain new and useful Improvements in Processes of Reducing Sulfur Dioxid, of which the following is a specification.

This invention relates to a process of reducing gases containing sulfur dioxid by passing the same together with steam and reducing gases through a heated chamber filled with a catalyzer, and of collecting free sulfur thus reduced. The object of this invention is to cause perfect reduction of sulfur dioxid by accelerating catalytic action by the presence of a comparatively large quantity of steam.

I am aware that there is a process of reducing sulfur dioxid and separating therefrom free sulfur by passing the gas through white-hot carbon, or by passing it together with petroleum ether or the like, over heated catalyzer. But in this process, not only is the expense very great but the reduction is not complete and an amount of unreduced sulfur dioxid always remains. Moreover, according to this process, unless the sulfur dioxid is sufficiently concentrated, the petroleum ether, or the like, used as the reducing agent, burns for no purpose. For these reasons this process has never been used successfully for industrial purpose.

My invention is an improvement on the above process and consists in removing the above drawbacks by effecting complete reduction by the presence of a comparatively larger quantity of steam; and the following is an example of carrying it into practice.

Mix sulfur dioxid, or gas containing sulfurous acid such as comes out of furnaces for roasting ores, or the like, with a reducing agent, such as water gas, coal gas, carbon mono-oxid, or the like, and steam, and reduce the sulfur dioxid by passing the mixture through a chamber containing sulfids, sulfites or sulfates of alkali or alkaline earth metal, or double salts thereof, and heated to from 350° to 800° C., the sulfur vapor being led to a separate chamber where it is cooled and collected. The remaining gas is, after extracting therefrom the small quantity of hydrogen sulfid produced, allowed to escape into the air, or is used as fuel in subsequent reducing operation.

According to my invention the best result is obtained when for every 100 parts by volume of the sulfur dioxid about 50 parts by volume of steam is used when carbon mono-oxid is employed, and about 30 parts by volume when coal gas is used, as reducing agent.

Now, when sulfur dioxid is simply heated together with a hydrocarbon, such as petroleum ether or the like, part thereof undergoes the chemical change as shown in the following formula but the reaction is very slow, and therefore such process is not worth while to be used for industrial purpose in reducing sulfur dioxid:

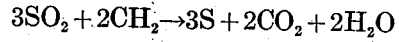
$$3SO_2 + 2CH_2 \rightarrow 3S + 2CO_2 + 2H_2O$$

Again, according to the method hitherto known in which sulfur dioxid is reduced by heating the same together with a hydrocarbon, such as petroleum ether or the like, using calcium sulfid as the catalyzer, the chemical changes which take place, are as follows:—

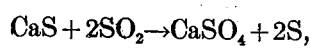
$$CaS + 2SO_2 \rightarrow CaSO_4 + 2S,$$
or
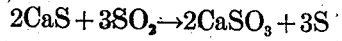
$$2CaS + 3SO_2 \rightarrow 2CaSO_3 + 3S$$

and the calcium sulfate or calcium sulfite formed acts as follows:—

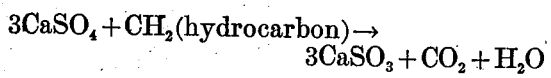
$$3CaSO_4 + CH_2(\text{hydrocarbon}) \rightarrow 3CaSO_3 + CO_2 + H_2O$$

$$CaSO_3 + CH_2 \rightarrow CaS + CO_2 + H_2O.$$

$$4CaSO_3 \rightarrow 3CaSO_4 + CaS.$$

Now, my invention is quite different in its object from the above processes. The steam which is mixed with sulfur dioxid seems to form hydrogen sulfid, which assists the reducing action, and the principal reactions may be expressed as in the following formula:—

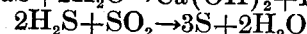
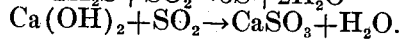
$$CaS + 2H_2O \rightarrow Ca(OH)_2 + H_2S$$
$$2H_2S + SO_2 \rightarrow 3S + 2H_2O$$
$$Ca(OH)_2 + SO_2 \rightarrow CaSO_3 + H_2O.$$

Thus my invention is quite different from the processes hitherto known both in reaction and in effect. Moreover, while, according to my invention, carbon mono-oxid, water gas, and the like, can be utilized as reducing agents, in the known process such can not be used, but a hydrocarbon which is more expensive, must necessarily be used. Furthermore, according to my invention there is no necessity of concentrating the sulfur dioxid to be reduced. Thus the process of my invention is more economical and efficient.

From experience and experiments I have found that it is impossible to reduce satisfactorily, even in the presence of a catalyzer, sulfur dioxid in a dilute condition with only steam produced by such a reducing agent as coal gas. Now, the main feature of my invention is to add steam from outside and to cause it to be present in a comparatively larger quantity, thereby assisting the coming into contact of the gas to be reduced with reducing agents and catalyzer. Thus, according to my invention, oxids of sulfur can be easily reduced in a comparatively lower temperature, and catalyzing action can be uniformly maintained without losing efficiency.

I claim:—

1. In the case of reducing sulfur dioxid or a gas containing sulfur dioxid in the presence of a catalyzer, a process characterized by the addition of a quantity of steam, not less than 30 volumes of steam for 100 volumes of sulfur dioxid, substantially as and for the purposes hereinbefore set forth.

2. In the case of reducing sulfur dioxid or a gas containing sulfur dioxid in the presence of a catalyzer, a process characterized by mixing the gas to be reduced with steam and a reducing gas and passing the mixture into a heated chamber filled with a catalyzer, substantially as and for the purposes hereinbefore set forth.

3. In the case of reducing sulfur dioxid or a gas containing sulfur dioxid in the presence of a catalyzer, a process characterized by mixing the gas to be reduced with steam and carbon mono-oxid, and passing the mixture into a heated chamber filled with a sulfate of an alkali-metal.

Signed at Tokyo, Japan, this 10th day of Dec., A. D. 1918.

TSUTOMU SHIOMI.